United States Patent
Tanaka

Patent Number: 6,004,224
Date of Patent: Dec. 21, 1999

[54] GOLF CLUB SHAFT, GRIP AND SOCKET

[75] Inventor: Hidetaka Tanaka, Park Side Gusuku 3E, 1010-10, Aza Tomigusuku, Tomigusukuson, Shimajiri-gun, Okinawa-ken, Japan

[73] Assignee: Hidetaka Tanaka, Okinawa-ken, Japan

[21] Appl. No.: 09/241,070

[22] Filed: Feb. 1, 1999

Related U.S. Application Data

[62] Division of application No. 08/974,923, Nov. 20, 1997.

[30] Foreign Application Priority Data

Nov. 24, 1996 [JP] Japan .................................. 8-329107

[51] Int. Cl.$^6$ .................................................. A63B 53/14
[52] U.S. Cl. .......................................... 473/297; 473/300
[58] Field of Search ................................. 473/300, 303, 473/568, 549, 551, 297

[56] References Cited

U.S. PATENT DOCUMENTS

| | | | |
|---|---|---|---|
| 3,075,768 | 1/1963 | Karns | 473/297 |
| 4,690,407 | 9/1987 | Reisner | 473/297 |
| 5,242,721 | 9/1993 | Oonuki | 428/34.5 |
| 5,782,705 | 7/1998 | Solari | 473/300 |

FOREIGN PATENT DOCUMENTS 2275201  8/1994  United Kingdom .

*Primary Examiner*—Jeanette Chapman
*Assistant Examiner*—Stephen L. Blau
*Attorney, Agent, or Firm*—Oblon, Spivak, McClelland, Maier & Neustadt, P.C.

[57] ABSTRACT

With respect to the cross-sectional profile of the shaft, the grip and the socket of a golf club in the direction perpendicular to the center axis line thereof, the inside portion which is located inwardly from the center axis line is formed of a material having a larger specific gravity than the outside portion (at the head side) which is located outwardly from the center axis line to provide a weight difference between the outside and inside portions of each of the shaft, the grip and the socket with making no variation to the shape of the cross-sectional profile. The weight difference is set to such a value that when the shaft, the grip or the socket is rolled on the horizontal plane, each is stopped with the same portion placed face down. More specifically, the weight difference between the outside (upper) portion and the inside (lower) portion with respect to the center axis line is set to 2 g or more for the shaft, 3 g or more for the grip and 0.1 g or more for the socket.

3 Claims, 2 Drawing Sheets

GOLF CLUB SHAFT, GRIP AND SOCKET

This application is a divisional of 08/974,923 filed Nov. 20, 1997.

BACKGROUND OF THE INVENTION

The present invention relates to an improvement in shaft, grip and socket which are used for a golf club.

The shaft of a conventional golf club is designed in a pipe structure having a circular section. Further, the grip of the golf club is normally formed of rubber or the like and designed in a cylindrical shape, and the base end of the shaft of the golf club is inserted and fitted into the cylindrical grip. The socket of the golf club is designed in a cylindrical shape so that the shaft is inserted in the cylindrical socket. The tip portion of the shaft is inserted into the hosel portion of the head and adhesively fitted therein while the shaft is inserted in the socket.

Such a conventional shaft is designed to be uniform in weight in the circumferential direction, and this design provides high balance to the operability of the shaft when the shaft is used alone. However, when the shaft is fitted to the head, the weight balance of the overall club to the shaft center axis is bad. That is, most of the head weight acts outwardly from the shaft center axis, and thus the centrifugal force which is applied during a swing motion magnifies the outward turning motion, so that the operability of the club and the reproducibility of the swing motion are lowered.

That is, the golf swing is greatly dependent on the gripping way of the grip. Even in the case of a club which is functionally excellent, the excellent function of the club cannot be effectively used if the grip thereof is bad.

In the case of the human, the thumb and the index finger are most frequently used in daily life and they can easily strengthen the force thereof. However, unlike a swing robot, the outward turning motion causes the underarm to be easily opened. Therefore, there has been required such a technique that the underarm is forcedly closed by the force at the little finger side, that is, at the inside of the grip, and the operability of the club and the reproducibility of the swing are enhanced by positively utilizing the motion that the club is separated from the human body due to the centrifugal force during the swing motion.

However, general golfers use the force at the thumb side more excessively as the weight of the shaft is reduced. In this case, the speed of the swing motion increases, but the motion is liable to be shifted to the outward turning motion. Consequently, as the shaft and the grip are reduced in weight, the head speed increases, but the outward turning motion is magnified because the weight at the hand side is excessively light. Accordingly, for the general golfers, the head speed is increased because the performance of the club is enhanced, but the operability of the club and the reproducibility of the swing motion are little improved. That is, the golf technique of the general golfers are little improved in spite of the improvement in performance of the club, and they cannot effectively use the improved performance of the club.

Further, even when the shaft and the grip are further reduced in weight, there is no difference in weight between the outside and the inside with respect to the shaft center axis. Accordingly, the general golfer who originally has an unstable swing arc cannot change their unstable swing motion even when the shaft and the grip are designed to be further light in weight.

SUMMARY OF THE INVENTION

In view of the foregoing problem of the conventional golf club, an object of the present invention is to provide a shaft, a grip and a socket for the golf club which can enhance the operability of the club and the reproducibility of the swing motion to thereby promote the technique of golfers themselves to be enhanced.

That is, the golf club shaft according to the present invention is designed so that with respect to the cross-sectional profile of the shaft in the direction perpendicular to the center axis line of the shaft, no variation is made to the shape of the cross-sectional profile, and the inside portion of the shaft which is located inwardly from the center axis line of the shaft is formed of a material having a larger specific gravity than the outside portion of the shaft (at the head side) which is located outwardly from the center axis line of the shaft so that the inside portion is heavier than the outside portion in weight to thereby provide a weight difference between the outside and inside portions of the shaft.

According to the golf club shaft of the present invention, the inside portion of the shaft with respect to the center axis line of the shaft is set to be heavier than the outside portion of the shaft as described above, and thus the weight ratio of the outside portion and the inside portion with respect to the center axis line of the shaft is reduced when the head is mounted on the shaft. Therefore, the centrifugal force to be applied during the swing motion is reduced more remarkably than that in the prior art. As a result, the swing motion can be more greatly stabilized to enhance the operability of the club and the reproducibility of the swing motion.

Further, the golf club grip of the present invention is designed in a cylindrical shape so as to be mountable on the base end of the shaft of the golf club and so that with respect to the cross-sectional profile of the grip in the direction perpendicular to the center axis line of the grip, the inside portion of the grip which is located inwardly from the center axis line of the grip is formed of a material having a larger specific gravity than the outside portion of the grip (at the head side) which is located outwardly from the center axis line of the grip so that the inside portion is heavier than the outside portion in weight to thereby provide a weight difference between the outside and inside portions of the grip.

As described above, according to the golf club grip of the present invention, the inside portion of the grip is set to be heavier than the outside portion of the grip. Therefore, when the head and the grip are mounted on the shaft, the weight ratio of the outside and inside portions with respect the center axis line of the shaft is reduced, and thus the stability of the swing motion is increased, thereby enhancing the operability of the club and the reproducibility of the swing motion.

Still further, the golf club socket according to the present invention is designed so as to be mountable on the tip portion of the shaft of the golf club and so that with respect to the cross-sectional profile of the grip in the direction perpendicular to the center axis line of the grip, no variation is made to the shape of the cross-sectional profile, and the inside portion of the socket which is located inwardly from the center axis line of the socket is formed of a material having a larger specific gravity than the outside portion of the socket (at the head side) which is located outwardly from the center axis line of the socket so that the inside portion is heavier than the outside portion in weight to thereby provide a weight difference between the outside and inside portions of the socket.

As described above, according to the golf club socket of the present invention, the inside portion of the socket is set to be heavier than the outside portion of the socket.

Therefore, when the head and the socket are mounted on the shaft, the weight ratio of the outside and inside portions with respect the center axis line of the shaft is reduced, and thus the stability of the swing motion is increased, thereby enhancing the operability of the club and the reproducibility of the swing motion.

If all the three parts of the shaft, the grip and the socket are designed so that the inside portions thereof are heavier than the outside portions thereof, the weight ratio of the outside and inside portions of the overall club with respect to the center axis line of the shaft can be further reduced to further enhance the performance of the golf club.

DETAILED DESCRIPTION OF THE PREFERRED EMBODIMENTS

Preferred embodiments according to the present invention in which the present invention is actually applied to the shaft, the grip and the socket of a golf club will be described with reference to the accompanying drawings.

Figure 1:
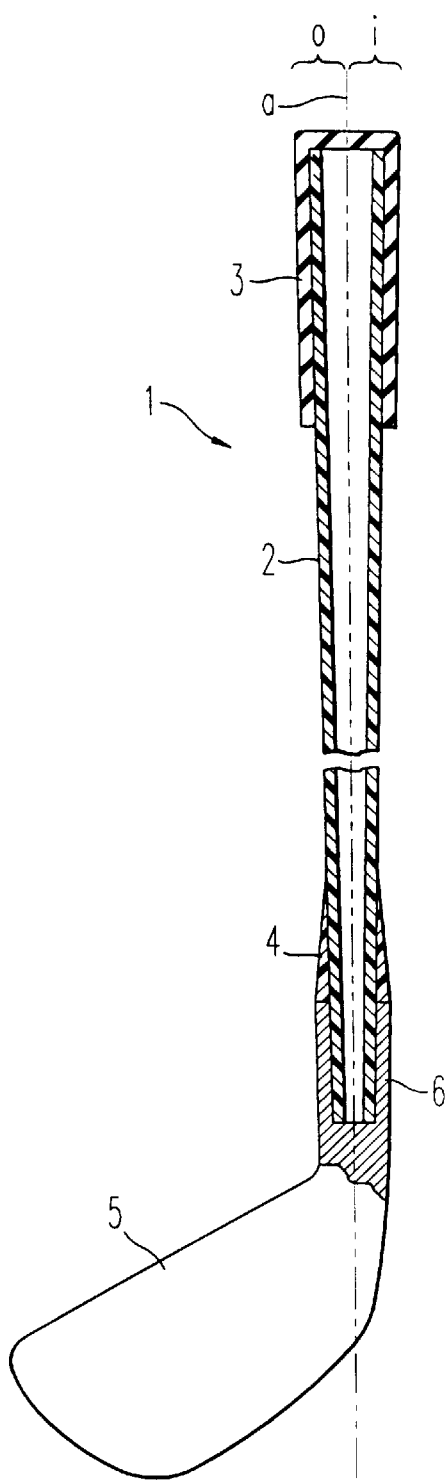
FIG. 1 is a cross-sectional view showing a golf club using a shaft, a grip and a socket according to the present invention in the longitudinal direction of the shaft.

FIG. 1 is a cross-sectional view showing a golf club using a shaft, a grip and a socket according to the present invention in the longitudinal direction of the shaft. In FIG. 1, "a" represents the center axis line of the shaft. In a golf club 1, one end portion of a shaft 2 is inserted and fitted in a grip 3, and the other end portion of the shaft 2 is inserted and fitted in a hosel portion 6 of the head 5 while the other end portion of the shaft 2 is inserted in the socket 4.

In this embodiment, each of the shaft 2, the grip 3 and the socket 4 according to the present invention is designed so that the inside area "i" thereof with respect to the center axis line "a" of the shaft is set to be heavier than the outside area "o" (i.e., the head 5 side) thereof which is located at the opposite side to the inside area "i" to provide a weight difference between the outside and inside areas "o" and "i". That is, the inside area "i" is formed of a material having a large specific gravity than the outside area "o" to provide the weight difference between the inside and outside areas.

The weight difference is preferably set to such a level that when each of the shaft 2, the grip 3 and the socket 4 is rolled on the horizontal plane, it is stopped with the same portion placed face down at least at all times. More specifically, the weight difference between the lower and upper portions of the shaft 2 with respect to the center axis line "a" is set to 2 g or more, the weight difference between the lower and upper portions of the grip 3 with respect to the center axis line "a" is set to 3 g or more, and the weight difference between the lower and upper portions of the socket 4 with respect to the center axis line "a" is set to 0.1 g or more. The weight difference thus set reduces the weight ratio of the outside area "o" and the inside area "i" of the entire club with respect to the center axis line "a", and the stability of the swing motion is enhanced, so that the operability of the club and the reproducibility of the swing can be improved.

FIGS. 2A, 2B, 2C and 2D are cross-sectional views of the shafts 2 which are cut out in the direction perpendicular to the center axis line "a" thereof, and show various methods of providing the weight difference so that the inside area "i" is heavier than the outside area "o".

The shaft 2 is a composite material shaft most of which is formed of a composite material 2a including any combination of carbon fiber, glass fiber, boron fiber. Kevlar, various resins, etc.

Figure 2A:
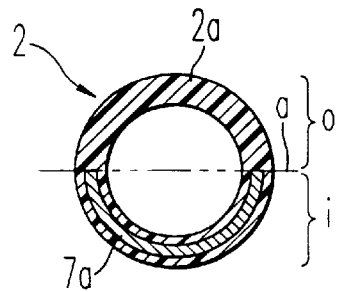
FIGS. 2A, 2B, 2C and 2D are cross-sectional views showing respective embodiments for providing a weight difference in respective composite-material shafts.

In the embodiment shown in FIG. 2A, a semi-cylindrical member 7a which is formed of a material having a specific gravity as high as possible such as steel, tungsten or the like, is embedded into the composite material 2a in the inside area "i" (at the opposite side to the head) of the shaft 2 with respect to the center axis line "a" of the shaft.

Figure 2B:
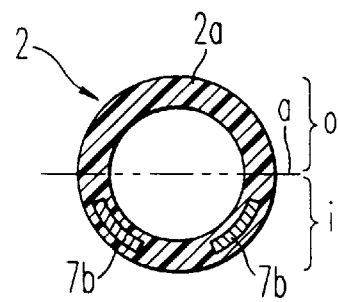

In the embodiment shown in FIG. 2B, in place of the semi-cylindrical member 7a, two band type members 7b each of which is arcuate in section are embedded into the composite material 2a. Further, in the embodiment shown in FIG. 2C, a band member 7c having a crescent shape is embedded into the composite material 2a.

Figure 2C:
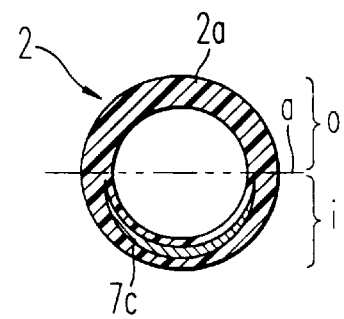

When the material having a large specific gravity is embedded into the composite material 2a as shown in FIGS. 2A, 2B and 2C, a mandrel is first wound by a carbon fiber resin sheet or the like, then the semi-cylindrical member 7a, the arcuate band-shaped members 7b or the crescent band-shaped member 7c is overlaid on the carbon fiber resin sheet in the inside area "i", and then a carbon fiber resin sheet or the like is wound thereon. After the resin is hardened, the mandrel is pulled out therefrom.

Further, the crescent band-shaped member 7c may be designed to be exposed into the inner surface of the shaft 2. In this case, in the state that the crescent band member 7c is overlaid on the mandrel, the carbon fiber resin sheet or the like is wound around the mandrel and the crescent band member 7c from the outside while spreading over the mandrel and the crescent band member 7c.

As shown in FIG. 2C, it is effective to shape both the ends of the members 7a, 7b, 7c having large specific gravity so that the thickness of both the ends is gradually reduced because this shape makes high the conformability between the members 7a, 7b, 7c and the composite member 2a. These weight-increasing members 7a, 7b, 7c may be extended so as to be somewhat exposed to the outside area "o".

Figure 2D:
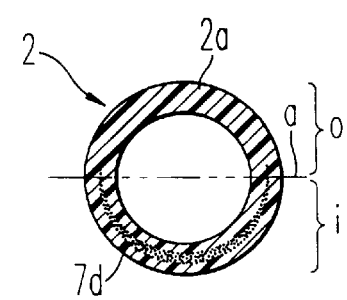

The above embodiment relates to the structure that one or two members of large specific gravity are embedded into the composite member. However, a member 7d hanging a wire or fiber shape which is formed of a material having a large specific gravity such as tungsten or the like may be embedded into a semi-cylindrical sectional area in the inside area "i" as shown in FIG. 2D. This structure is preferable in the point of the easiness of the manufacturing process. In this case, both carbon fiber and tungsten wire are wound around the mandrel while interwoven with each other. Further, an enforcing member formed of glass fiber, boron fiber, Kevlar, or the like may be disposed at the opposite side to the tungsten wire 7d to surely prevent warping of the shaft.

In the case of the conventional shaft, the weight of each of the inside area "i" and the outside area "o" is set to 35 g, and thus the total weight is equal to 70 g. However, in the case where the sectional structure shown in FIG. 2D is adopted and carbon fiber and tungsten wire are used as the composite material 2a and the weight-increasing member 7d respectively, the weight of the outside area "o" is equal to 35 g and the weight of the inside area "i" is equal to 75 g. Accordingly, the weight difference between the inside area "i" and the outside area "o" is equal to 40 g.

Figure 3A:
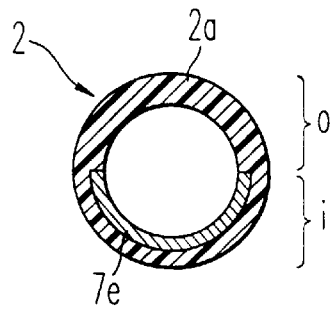
FIGS. 3A and 3B show an embodiment of a shaft in which the weight difference is provided by a clad structure.
Figure 3B:

FIG. 3 shows an embodiment which provides the weight difference by the clad structure. As shown in FIG. 3A, the overall outside area "o" is formed of aluminum, a composite material or the like which has a small specific gravity, however, the outer peripheral side of the inside area "i" is formed of aluminum, a composite material or the like which has a small specific gravity like the outside area "o" while the inner peripheral side of the inside area "i" comprises a thin plate 7e which is formed of a material having a large specific material such as tungsten or the like.

In order to produce the clad structure as described above, a plate member 2a which is formed of a material having a small specific gravity is designed to be thinner at a half portion thereof so that a step is formed between both the half portions of the plate member 2a, and a thin plate 7e which is formed of a material having a large specific gravity such as tungsten or the like is overlaid on the thinner half portion of the plate member 2a and adhesively attached to the thinner half portion by brazing to unify the thin plate 7e and the thinner half portion of the plate member 2a.

In this state, the unified body of the plate member 2a having the thin plate 7e is gradually rounded and finally shaped into a cylindrical form by means of a die, thereby obtaining the shaft whose section is as shown in FIG. 3A.

Figure 4:
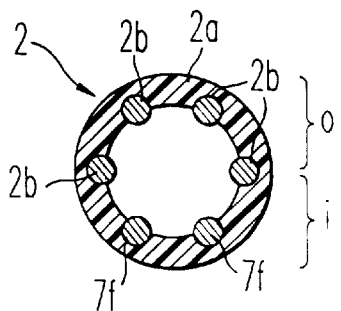
FIG. 4 is a cross-sectional view an embodiment in which the weight difference is provided by embedding a wire into a longitudinal grove in the shaft.

FIG. 4 shows another embodiment of the shaft. As shown in FIG. 4, plural semicircular grooves are formed inside the shaft 2a so as to extend in the longitudinal direction of the shaft 2a, and wires which are just circular in section are embedded into the grooves. These wires comprise wires 2b which are formed of materials having small specific gravity and embedded in the area "o" at the outside from the center axis line "a" of the shaft, and wires 7f which are formed of materials having large specific gravity and embedded in the area "i" at the inside from the center axis line "a" of the shaft. As a result, the inside area "i" is heavier than the outside area "o" to thereby provide the weight difference between the inside and outside areas.

In the above-described embodiments, the weight difference is provided between the inside and outside portions so that the inside portion of the shaft with respect to the center axis line "a" is set to be heavier than the outside portion of the shaft, however, the present invention is not limited to these embodiments. At any rate, the shaft is designed so that the outer diameter and the inner diameter of the shaft 2 are set to the same level as the normal shaft and no variation is made to the shape of the shaft. Further, it is also designed so that the sectional shape of the shaft is identical over the whole periphery thereof, the distortion amount is equal between the clockwise and counterclockwise directions, and the hardness is constant. It is needless to say that this structure does not violate the golf rule.

Materials having a specific gravity larger than the main material of the shaft (the composite material and the metal material) 2a are suitably used for the weight increasing members 7a to 7f, however, it is preferable that the characteristics of these materials are close to the main material of the shaft as much as possible. As a result, the weight difference with respect to the center axis line of the shaft can be increased without damaging the original performance of the shaft such as torque, hardness, strength, etc.

FIGS. 2 to 4 show the case of the shaft 2. However, if the same construction is applied to each of the grip and the socket, the weight difference as described above can be provided so that the inside area "i" is heavier than the outside area "o" with respect to the center axis line "a".

Figure 5:
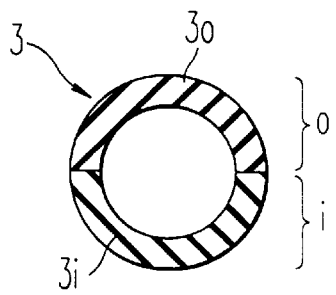
FIG. 5 is a cross-sectional view showing an embodiment in which the weight difference is provided in the grip.

FIG. 5 is a cross-sectional view showing an embodiment on the grip. The grip 3 is produced by shaping an elastic member such as rubber or the like into a semi-cylindrical body and then adhesively attaching a pair of semi-cylindrical bodies while confronting the bodies to each other. In the present invention, the density of the rubber at the outside portion 3o of the grip is reduced to lower the specific gravity, and the density of the rubber at the inside portion 3i is increased to heighten the specific gravity.

Accordingly, when the outside portion 3o and the inside portion 3i are confronted to each other and adhesively attached to each other to be unified into one body, the inside portion 3i is heavier than the outside portion 3o, so that the weight difference is provided between the inside and outside portions 3i and 3o. If tungsten wire or the like is embedded into the inside portion 3i, the weight difference can be further increased.

As described above, when the rubber density of the outside portion 3o of the grip which abuts against the thumb of a golfer is reduced, the hardness of the grip is lowered and thus the grip is softened. Therefore, the grip is soft to the touch of the golfer's thumb, and thus the golfer can relax his her thumb, so that the operability of the club and the reproducibility of the swing can be improved.

Figure 6:
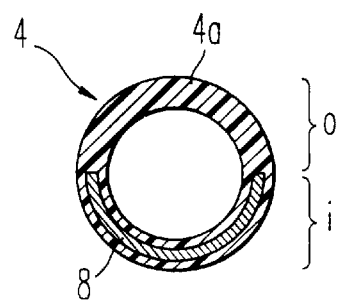
FIG. 6 is a cross-sectional view showing an embodiment in which the weight difference is provided in the socket.

FIG. 6 is a cross-sectional view showing an embodiment on the socket. A socket 4 has a cylinder portion 4a formed of plastic or the like, and a semi-cylindrical member 8 which is formed of a material having a large specific gravity such as steel, tungsten or the like is embedded into the inside area "i". Accordingly, the inside area "i" is heavier than the outside area "o" and thus the weight difference is provided therebetween.

As the weight increasing member for the shaft, the grip and the socket, lead powder may be mixed into rubber or synthetic resin or a lead plate member may be embedded therein.

The weight-increasing member may be provided over the entire length of the shaft, the grip and the socket, or may be partially provided.

As described above, according to the shaft of the present invention, the shaft weight of the outside portion of the shaft with respect to the shaft center axis line, that is, the shaft weight at the thumb side is reduced, and conversely the shaft weight of the inside portion of the shaft with respect to the shaft center axis line (i.e., at the little finger side), that is, the weight of the portion which acts on an adductor muscle in the golf terms is increased so that a cocking action and a pulling (attracting) action during a down-swing motion can be easily performed. Therefore, the swing motion can be performed by effectively using the weight of the shaft, and the operability of the club and the reproducibility of the swing can be enhanced.

Further, according to the grip and the socket, the weight ratio of the outer portion and the inner portion with respect to the center axis line of the shaft is reduced by setting the inside portion to be larger in weight than the outside portion, and the stability of the swing motion is enhanced, so that the operability of the club and the reproducibility of the swing can be enhanced.

Still further, when all the three parts of the shaft, the grip and the socket are designed so that the inside portion is heavier than the outside portion, the weight ratio of the overall club to the shaft center axis line is further reduced, so that the performance of the golf club can be more enhanced.

The shaft, the grip and the socket of the golf club according to the present invention may be provided as a golf club after they are fabricated, or may be provided as a single body before they are fabricated. Further, the material of the shaft is not limited to a special one, and any material such as a composite material using carbon fiber or the like, steel or the like may be used.

What is claimed is:

1. A golf club grip wherein in that said grip is designed in a cylindrical shape for mounting on a base end of a shaft of a golf club so that with respect to the cross-sectional profile of said grip in the direction perpendicular to a center axis line of said grip, an inside portion of said grip which is located inwardly from the center axis line of said grip is formed of a material having a larger specific gravity than an outside portion of said grip at a head side portion thereof, which is located outwardly from the center axis line of said grip so that the inside portion is heavier than the outside portion in weight to thereby provide a weight difference between the outside and inside portions of said grip the weight difference being located in a grip wall.

2. The golf club grip as claimed in claim 1, wherein the weight difference is set to such a level that when said grip is rolled on the horizontal plane, said grip is stopped with the same portion placed face down at least at all times.

3. The golf club grip as claimed in claim 1, wherein the weight difference is set to 3 g or more.

* * * * *